(12) United States Patent
Seto et al.

(10) Patent No.: US 6,753,280 B2
(45) Date of Patent: Jun. 22, 2004

(54) ULTRAVIOLET/INFRARED ABSORBENT GREEN GLASS

(75) Inventors: Hiromitsu Seto, Osaka (JP); Yukihito Nagashima, Osaka (JP); Shigekazu Yoshii, Osaka (JP); Nbuyuki Yamamoto, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/166,064

(22) Filed: Jun. 11, 2002

(65) Prior Publication Data

US 2003/0083188 A1 May 1, 2003

(30) Foreign Application Priority Data

Jun. 21, 2001 (JP) .......................................... 2001-188260
Jun. 29, 2001 (JP) .......................................... 2001-197642

(51) Int. Cl.⁷ ................................................ C03C 3/087
(52) U.S. Cl. ............................................ 501/70; 501/71
(58) Field of Search ........................................... 501/70.71

(56) References Cited

U.S. PATENT DOCUMENTS

| 5,318,931 A | * | 6/1994 | Nakaguchi et al. | ........... 501/64 |
| 5,593,929 A | * | 1/1997 | Krumwiede et al. | .......... 501/70 |
| 5,858,896 A | * | 1/1999 | Nagashima et al. | .......... 501/66 |
| 6,017,837 A | * | 1/2000 | Nagashima et al. | .......... 501/64 |
| 6,046,122 A | * | 4/2000 | Nagashima et al. | .......... 501/64 |
| 6,063,718 A | * | 5/2000 | El Khiati et al. | ............. 501/70 |
| 6,468,934 B2 | * | 10/2002 | Nagashima et al. | .......... 501/64 |
| 6,544,915 B2 | * | 4/2003 | Nagashima | .................. 501/64 |
| 6,551,953 B1 | * | 4/2003 | Gulotta et al. | ................. 501/70 |
| 2002/0058579 A1 | * | 5/2002 | Seto et al. | .................... 501/71 |
| 2002/0068678 A1 | * | 6/2002 | Seto et al. | .................... 501/70 |

FOREIGN PATENT DOCUMENTS

| JP | 10-45425 | 2/1998 |
| JP | 10-114540 | 5/1998 |

OTHER PUBLICATIONS

Patent Abstract of Japan, vol. 2000, No. 24, JP2001–180966, Jul. 3, 2001, Applicant: Central Glass Co., Ltd.

* cited by examiner

Primary Examiner—Helene Klemanski
Assistant Examiner—Elizabeth A. Bolden
(74) Attorney, Agent, or Firm—Kanesaka & Takeuchi

(57) ABSTRACT

Ultraviolet/infrared absorbent green glass is composed of soda-lime-silica glass including 0.001 to 2 wt. % $Li_2O$ and, as colorant, 0.4 to 2 wt. % total iron oxide expressed as $Fe_2O_3$ (T-$Fe_2O_3$) wherein FeO expressed as $Fe_2O_3$ is 15 to 60% of T-$Fe_2O_3$. The glass has visible light transmittance (YA) of not less than 70%, measured by using the CIE illuminant A, and total solar radiation transmittance (TG) of not greater than 60%, when the glass has a thickness between 2.1 mm and 6 mm.

9 Claims, 2 Drawing Sheets

ULTRAVIOLET/INFRARED ABSORBENT GREEN GLASS

FIELD OF THE INVENTION

The present invention relates to a green glass which has advantages of high heat ray absorptivity, high ultraviolet absorptivity, high quality, and high productivity. It particularly relates to a glass having high visible light transmittance which has, a shade of green, and has a high heat ray absorption performance, and it more particularly relates to a green glass which is suitable for a window glass to be reinforced and installed in a vehicle.

BACKGROUND OF THE INVENTION

A variety of glasses with ultraviolet/infrared absorptivity to be used as a vehicle windshield have been proposed with the view of preventing degradation of luxurious interior materials and reducing cooling load of the vehicle. In view of comfort of passengers and privacy protection, a glass having low visible light transmittance is preferably used for a rear window glass of a vehicle.

The front windshield of a vehicle is obligated to have a visible light transmittance higher than a specific level for enough visibility of a driver. A glass having high visible light transmittance and provided with ultraviolet and heat ray absorptivity has a greenish shade because the ends of its ultraviolet absorption range and infrared absorption range overlap the visible range.

Ultraviolet/infrared absorbent glasses having low to middle visible light transmittance, low ultraviolet transmittance and low total solar radiation transmittance have been disclosed in Japanese patent H10-114540A and H10-45425A. Since these ultraviolet/infrared absorbent glasses have high heat ray absorption characteristics, productivity of each glass in a glass melting furnace is low. Inside the melting furnace, a top of the glass is directly heated with flames, but the bottom of the glass material can not be sufficiently heated because a large part of heat rays directed at the surface of the glass material by the radiation of the flames are absorbed by the top of the glass material. It is thus difficult to melt the glass material in the melting furnace uniformly.

The glass material is necessarily maintained at a higher-than-normal degree of reduction in order to provide high heat ray absorption characteristics thereto. Therefore, a large amount of reducing agents, mainly including graphite powder, etc., can be added into the glass batch, but such agents are liable to cause unfused silica because the agents can exceedingly react with sulfate, mainly including sodium sulfate, etc., which is added to the glass batch as a refining agent.

In order to melt the glass material uniformly, at least one of the following processes can be adopted, such as: lowering the amount of the glass material below that for the ordinary operation; heating the bottom of the glass material by energizing electrodes inserted into the bottom of the furnace; and bubbling the glass material.

However, lowering the amount of the glass material below that for the ordinary operation causes decrease of the production capacity, thereby raising the production cost. Electrical heating by insertion of electrodes in the bottom of the furnace and bubbling the glass material require modification of the facilities. These processes can cause defects, such as: generation of a lot of defects such as bubbles in the glass depending upon the operating conditions, and result in significant decline of the production capacity.

SUMMARY OF THE INVENTION

The low transmittance glass of the present invention is composed of soda-lime-silica glass comprising 0.001 to 2 wt. % $Li_2O$ and, as colorant, 0.7 to 2.2 wt. % total iron oxide (T-$Fe_2O_3$) expressed as $Fe_2O_3$. The glass with a thickness between 2.1 mm and 6 mm has visible light transmittance (YA) of not greater than 65%, measured by using the CIE illuminant A, total solar radiation transmittance (TG) of not greater than 60%, and ultraviolet transmittance (Tuv) defined by ISO 9050 of not greater than 25%.

The low transmittance glass of the present invention has superior heat ray absorption properties, and it is improved in quality and productivity by including $Li_2O$ in its base glass composition so as to lower viscosity of the glass material, accelerating melt and homogenization of the glass material, and it also has superior capacity for reinforcement.

Since the glass material of the low transmittance glass of the present invention has low viscosity, melt and homogenization of the glass material are accelerated. The low transmittance glass is improved in quality and productivity, and is provided with low infrared transmittance.

Since when applied with reinforcement by air blast cooling, the low transmittance glass of the present invention obtains higher surface compression than that of conventional ones, it is superior in capacity for reinforcement. The low transmittance glass of the present invention has low visible light transmittance and low ultraviolet transmittance, so that it is suitable for a rear view window of a vehicle.

The ultraviolet/infrared absorbent green glass of the present invention is composed of soda-lime-silica glass comprising 0.001 to 2 wt. % $Li_2O$ and, as colorant, 0.4 to 2 wt. % total iron oxide (T-$Fe_2O_3$) expressed as $Fe_2O_3$ wherein FeO expressed as $Fe_2O_3$ is 15 to 60% of T-$Fe_2O_3$. The glass with a thickness between 2.1 mm and 6 mm has visible light transmittance (YA) of not less than 70%, measured by using the CIE illuminant A, and total solar radiation transmittance (TG) of not greater than 60%.

The ultraviolet/infrared absorbent green glass of the present invention has superior heat ray absorption properties, and it is improved in quality and productivity by including $Li_2O$ in its base glass composition so as to lower viscosity of the glass material, accelerating melt and homogenization of the glass material, and it also has superior capacity for reinforcement.

Since the glass material of the low ultraviolet/infrared absorbent green glass of the present invention has low viscosity, melt and homogenization of the glass material are accelerated. The green glass is improved in quality and productivity, and it is provided with low infrared transmittance. Since when applied with reinforcement by air blast cooling, the glass obtains higher surface compression than that of conventional ones, it is superior in capacity for reinforcement. The green glass has high visible light transmittance and low ultraviolet transmittance, so that it is suited for a window of a vehicle.

DETAILED DESCRIPTION OF THE PREFERRED EMBODIMENTS

[Low Transmittance Glass]

A low transmittance glass of the present invention may be composed of a base glass composition comprising:

65 to 80 wt. % $SiO_2$;

0 to 5 wt. % $Al_2O_3$;

0 to 10 wt. % MgO;

5 to 15 wt. % CaO wherein a total amount of MgO and CaO is 5 to 15 wt. %;

10 to 20 wt. % $Na_2O$;

0 to 5 wt. % $K_2O$ wherein a total amount of $Na_2O$ and $K_2O$ is 10 to 20 wt. %; and 0 to 5 wt. % $B_2O_3$.

The low transmittance glass of the present invention is preferable to include at least one selected from the group consisting of Se, CoO, $Cr_2O_3$, and NiO as colorant. The preferable content of Se is 0.0001 to 0.1 wt. %, that of CoO is 0.0001 to 0.1 wt. %, that of $Cr_2O_3$ is 0.001 to 2 wt. %, and that of NiO is 0.001 to 2 wt. %.

The low transmittance glass of the present invention is preferable to include at least one selected from the group consisting of $TiO_2$, $CeO_2$, $MoO_3$, $V_2O_5$ and $La_2O_3$ as colorant in an amount of 0.0001 to 1 wt %.

This low transmittance glass of the present invention has visible light transmittance (YA) of 5 to 65%, measured by using CIE illuminant A, total solar radiation transmittance (TG) of not greater than 50%, and ultraviolet transmittance (Tuv) defined by ISO 9050 not greater than 20%, in case that the glass has a thickness between 2.1 mm and 6 mm.

The description will be made as regard to the low transmittance glass composition of the present invention. It should be noted that content of each component will be represented with percentage by weight.

$Li_2O$ is a component for lowering viscosity of the glass material and thus improving productivity of the glass. Since $Li_2O$ has an effect of making thermal expansion coefficient and Young's modulus of the glass larger in case that the content of $Li_2O$ is in a specific range, $Li_2O$ is also a component for increasing surface compression of the glass when the glass is applied with reinforcement by air blast cooling, improving a capacity for reinforcement of the glass.

Figure 1:
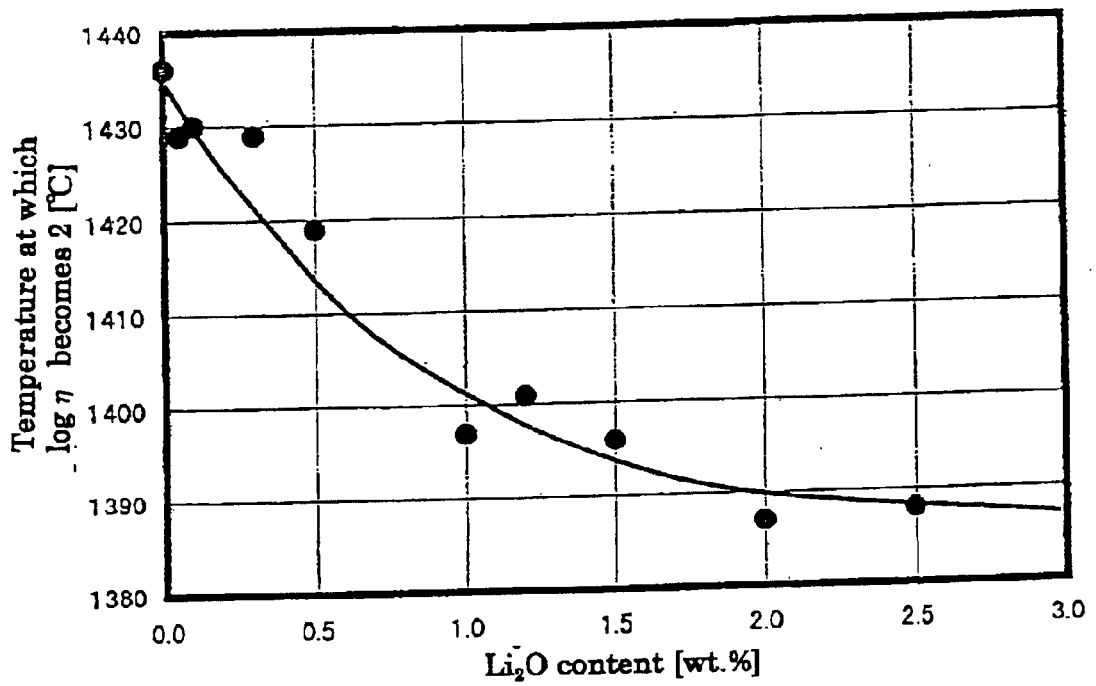
FIG. 1 is a graph showing a relationship between $Li_2O$ content and temperature at which log η becomes 2.

When the content of $Li_2O$ is not greater than 2%, viscosity of the glass material becomes lowered as the content of Li2O increases, and thus productivity of the glass becomes improved. However, when the content of $Li_2O$ is greater than 2%, the effect of lowering viscosity decreases even though the content of $Li_2O$ increases. When the content of $Li_2O$ is less than 0.001%, $Li_2O$ does not sufficiently give its effect of lowering viscosity to the glass material. The relationship between the content of $Li_2O$ and the temperature at which log η becomes 2 in a typical soda-lime-silica glass is shown in FIG. 1. It is noted that the temperature at which log η becomes 2 decreases monotonously as the content of $Li_2O$ increases, and the slope becomes gentle as the content of $Li_2O$ exceeds 2%. Therefore, the content of $Li_2O$ is set in the 0.001 to 2% range in the present invention. Since $Li_2O$ material is costly, the content of $Li_2O$ is preferably taken as less than 2% from a compromise between the cost and the effect of $Li_2O$.

Figure 2:
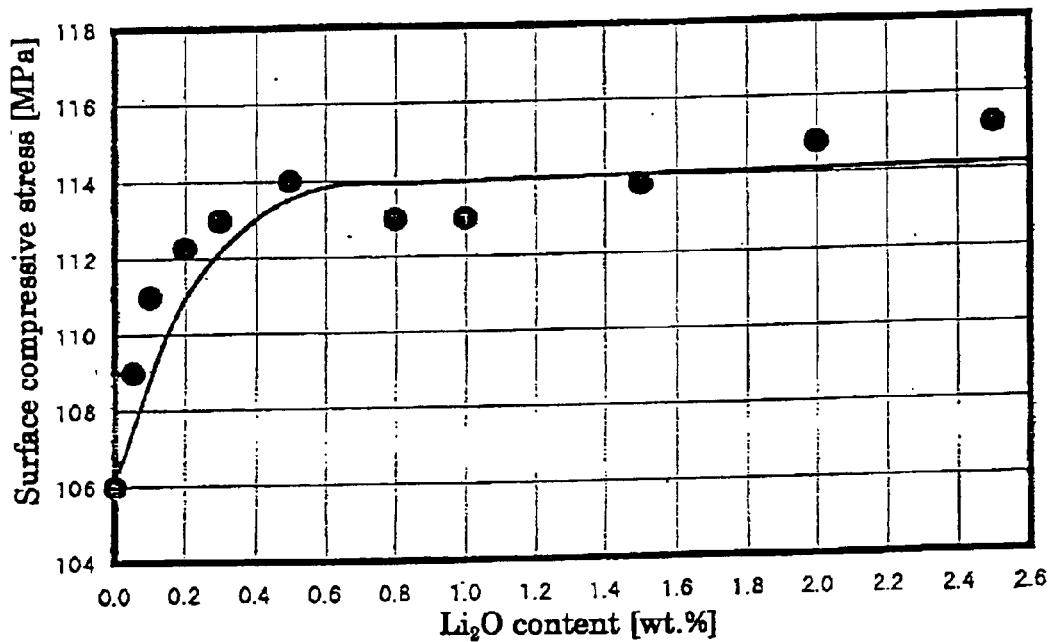
FIG. 2 is a graph showing a relationship between $Li_2O$ content and surface compression.

When the content of $Li_2O$ is not greater than 0.5%, surface compression of the glass reinforced with air blast cooling increases as the content of $Li_2O$ increases. When the content of $Li_2O$ is more than 0.5%, surface compression of the glass is approximately constant even though the content of $Li_2O$ increases. The relationship between the content of $Li_2O$ and the surface compression in a typical soda-lime-silica glass is shown in FIG. 2. It is noted that although the surface compression increases as the content of $Li_2O$ increases, it becomes approximately constant as the content of $Li_2O$ exceeds 0.5%. The content of $Li_2O$ is preferably taken as 0.5% or less from a compromise between the cost and the effect of $Li_2O$. When the increase of surface compression of the glass by addition of $Li_2O$ is expected, $Li_2O$ is preferably added in an amount of 0.05% or more.

Iron oxide is present in the form of $Fe_2O_3$ and the form of FeO in the glass. $Fe_2O_3$ is a component for improving the ultraviolet absorptivity and FeO is a component for improving the infrared absorptivity. When the total amount of iron oxide (T-$Fe_2O_3$) expressed as $Fe_2O_3$ is less than 0.7%, the efficiency of ultraviolet and infrared absorptivity becomes small so as not to provide desired optical properties. On the other hand, when T-$Fe_2O_3$ exceeds 2.2%, the infrared absorptivity of T-$Fe_2O_3$ becomes too high to produce the glass in an ordinary melting furnace, and the color unpreferably becomes too greenish. In case of successively producing glasses by a glass melting furnace with a large amount of T-$Fe_2O_3$, long time is required to change the glass composition in the furnace.

Figure 3:
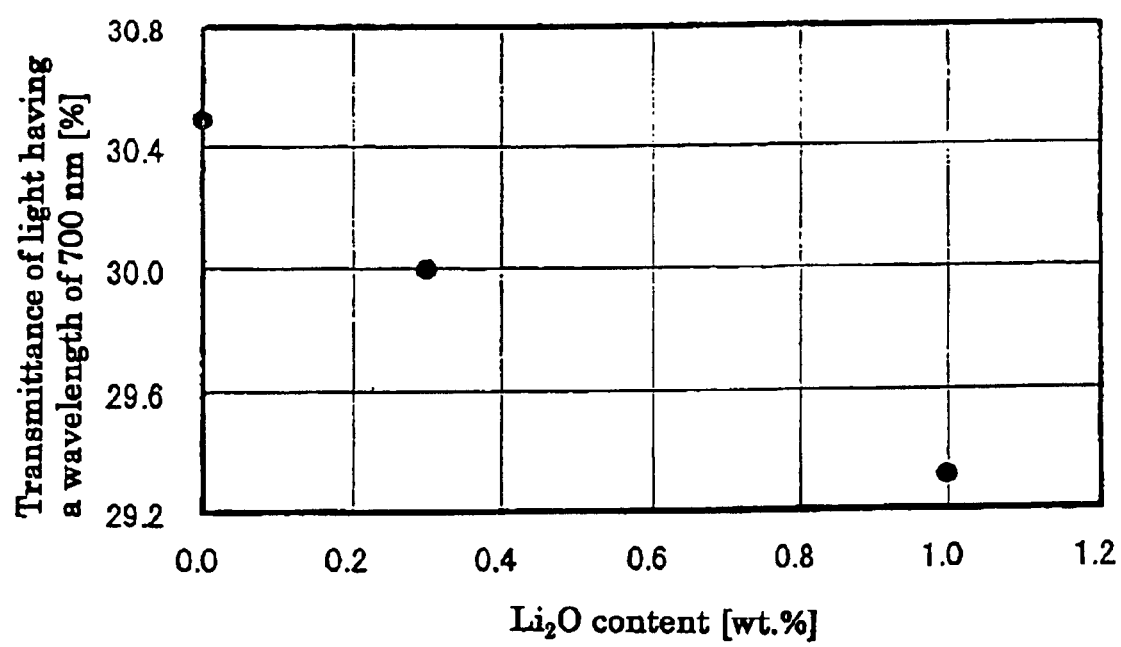
FIG. 3 is a graph showing a relationship between $Li_2O$ content and transmittance of light having a wavelength of 700 nm.

In the present invention, an effect of shifting the light absorption peak of FeO toward the short wavelength range of light is given by coexistence of FeO and $Li_2O$ in the soda lime glass. In order to illustrate this effect, the relationship between the content of $Li_2O$ and the transmittance of light having a wavelength of 700 nm is shown in FIG. 3. It is noted that the transmittance of light having a wavelength of 700 nm decreases according as the content of $Li_2O$ increases. Addition of $Li_2O$ makes it possible to lower visible light transmittance effectively with a small content of FeO.

When the FeO/T-$Fe_2O_3$ ratio (a weight of FeO expressed as $Fe_2O_3$ against T-$Fe_2O_3$) is less than 20%, sufficient heat ray absorptivity can not be obtained. When FeO/T-$Fe_2O_3$ ratio is more than 50%, silica-rich ream and silica scum are present in a glass because the glass is highly reduced, resulting in decrease of productivity.

$SiO_2$ is a main component for forming skeleton of glass. Less than 65% $SiO_2$ lowers the durability of the glass and more than 80% $SiO_2$ raises the melting temperature of the glass so high.

$Al_2O_3$ is a component for improving the durability of the glass. More than 5% $Al_2O_3$ raises the melting temperature of the glass so high.

MgO and CaO improve the durability of the glass and adjust a liquidus temperature and viscosity of the glass. More than 10% MgO raises the liquidus temperature. Less than 5% or more than 15% CaO raises the liquidus temperature of the glass. The durability of the glass is lowered when the total amount of MgO and CaO is less than 5%, while the liquidus temperature is increased when the total exceeds 15%.

$Na_2O$ and $K_2O$ prompt the glass to melt. The efficiency of promotion of melting becomes poor when $Na_2O$ is less than 10% or the total of $Na_2O$ and $K_2O$ is less than 10%, while the durability of the glass is lowered when $Na_2O$ exceeds 20% or the total of $Na_2O$ and KO exceeds 20%. $K_2O$ is preferable not to exceed 5% because of its expensive cost.

$B_2O_3$ is a component for improving the durability of the glass, prompting to melt, and yet enhancing the ultraviolet absorption. $B_2O_3$ should be less than 5%, since difficulties during molding are caused due to the vaporization of $B_2O_3$ when $B_2O_3$ exceeds 5%.

Se, CoO, $Cr_2O_3$ and NiO are components for adjusting visible light transmittance and color of the glass, so that it is preferable to add at least one of these components in the glass.

Se gives a red to pink shade to the glass and also gives grayish shade to the glass by cooperating with FeO or CoO. When Se is included in the glass, more than 0.1% Se reduces visible light transmittance too much, so that the glass can not be provided with desired properties. The preferable content of Se is 0.0001 to 0.1%.

CoO gives a blue shade to the glass and also gives grayish shade to the glass by cooperating with Se, NiO or $Fe_2O_3$. When CoO is included in the glass, more than 0.1% CoO reduces visible light transmittance too much, so that the glass can not be provided with desired properties. The preferable content of CoO is 0.0001 to 0.1%.

$Cr_2O_3$ gives a green shade to the glass and also adjusts visible light transmittance and color of the glass by cooperating with Se, NiO, CoO or $Fe_2O_3$. More than 2% $CrO_3$ reduces visible light transmittance too much, so that the glass can not be provided with desired properties. The preferable content of $Cr_2O_3$ is 0.001 to 2%.

NiO gives a brown to purple shade to the glass and also gives grayish shade to the glass by cooperating with FeO or CoO. More than 2% NiO reduces visible light transmittance too much, so that the glass can not be provided with desired optical properties, and it unpreferably activates formation of nickel sulfide stones. The preferable content of NiO is 0.001 to 2%.

In order to obtain more desirable shade and properties, at least one selected from the group consisting of $TiO_2$, $CeO_2$, $MoO_3$, $V_2O_5$ and $La_2O_3$ may be added as auxiliary ultraviolet absorbing agent in an amount of 0.0001 to 1%.

Sulfate of alkaline or alkaline earth metal has been added as a refining agent for the glass, and the glass usually includes $SO_3$ in an amount of about 0.1 to 0.5%. One or more than two among $Sb_2O_3$, $SnO_2$, and the like may be added as a reducing agent or a refining agent for the glass in an amount not greater than 1%. In order further securely to prevent the formation of nickel sulfide stones, ZnO may be added in an amount not greater than 1%.

The low transmittance glass of the present invention has visible light transmittance (YA) of not greater than 65%, measured by using the CIE illuminant A, total solar radiation transmittance (TG) of not greater than 60%, and ultraviolet transmittance (Tuv) defined by ISO 9050 of not greater than 25%, when the glass has a thickness in a range of 2.1 to 6 mm. YA is preferable to be in a range of 5 to 65%, TG is preferable not to exceed 50%, and Tuv is preferable not to exceed 20%.

Hereinafter, examples and comparative examples of the low transmittance glass of the present invention will be described.

EXAMPLES 1–10

The formulation of typical soda-lime-silica glass material is shown in Table 1. Lithium oxide, ferric oxide, metallic selenium, cobalt oxide, chromium oxide, nickel oxide, titanium oxide, cerium oxide, molybdenum oxide, vanadium pentoxide and lanthanum oxide were added to the glass material as desired. The glass material thus prepared was held in an electric furnace at 1500° C., for 4 hours. The molten glass was cast on a stainless plate and held at 650° C., for 1 hour, and then annealed to the room temperature in the furnace so as to obtain 6 mm thick glass plates.

TABLE 1

| component | content [g] |
| --- | --- |
| silica sand | 973.6 |
| dolomite | 255.7 |
| limestone | 30.24 |
| soda ash | 230.02 |
| salt cake | 9.881 |
| carbon | 0.617 |
| total | 1500 |

The obtained glass plates were polished, so that each glass plate has a thickness between 3.5 mm and 5 mm, so as to obtain the samples. Each sample was determined in optical properties including visible light transmittance (YA) measured by using the CIE illuminant A, total solar radiation transmittance (TG), ultraviolet transmittance (Tuv) defined by ISO 9050, dominant wavelength (DW) and excitation purity (Pe) measured by using the CIE illuminant C.

The samples were also determined in physical properties including glass transition temperature (Tg), deformation temperature (Td), mean thermal expansion coefficient of the 50 to 350° C. range ($\alpha_{(50-350)}$), Young's modulus (E), surface compression and the temperature at which log η becomes 2. Each sample was formed into a rod-like shape having a length of 15 mm and a diameter of 5 mm, and then it was loaded with a load of 5 g and heated from the room temperature to 700° C. at a rate of 10° C. per minutes with silica glass rod prepared as a standard sample by the use of EXSTAR 6000 (SEIKO Electronics Inc.), so as to measure glass transition temperature (Tg), deformation temperature (Td) and mean thermal expansion coefficient of the 50 to 350° C. range ($\alpha_{(50-350)}$). Young's modulus (E) was measured with ultrasonic wave according to sing-around method, surface compression was measured with a Babinet-Style surface stress meter according to via-scope method, and the temperature at which log η becomes 2 was measured according to platinum ball drawing method.

The base glass composition, the content of colorant, $FeO/T\text{-}Fe_2O_3$ ratio, the optical properties and the physical properties of each sample were shown in Tables 2 and 3. The contents of the components in these tables are indicated as percentage by weight.

TABLE 2

|  | Example 1 | Example 2 | Example 3 | Example 4 | Example 5 |
| --- | --- | --- | --- | --- | --- |
| glass composition [wt. %] | | | | | |
| $SiO_2$ | 71.0 | 71.5 | 70.7 | 71.4 | 71.2 |
| $Al_2O_3$ | 1.40 | 0.11 | 0.89 | 1.35 | 1.35 |
| MgO | 3.64 | 3.75 | 4.13 | 3.68 | 3.68 |
| CaO | 7.66 | 8.62 | 8.38 | 7.75 | 7.74 |

TABLE 2-continued

|  | Example 1 | Example 2 | Example 3 | Example 4 | Example 5 |
|---|---|---|---|---|---|
| $Na_2O$ | 13.7 | 13.6 | 13.2 | 13.7 | 13.6 |
| $K_2O$ | 0.91 | 0.07 | 0.23 | 0.77 | 0.76 |
| $Li_2O$ | 1.00 | 2.00 | 0.50 | 0.05 | 0.12 |
| $T\text{-}Fe_2O_3$ | 1.25 | 1.40 | 1.42 | 1.30 | 1.30 |
| $FeO/T\text{-}Fe_2O_3$ | 0.23 | 0.24 | 0.22 | 0.23 | 0.23 |
| NiO | 0.065 | — | — | 0.016 | 0.098 |
| CoO | 0.019 | 0.022 | 0.012 | 0.004 | 0.020 |
| Se | 0.001 | 0.003 | 0.0005 | — | — |
| $Cr_2O_3$ | — | — | 0.002 | — | — |
| $TiO_2$ | 0.02 | 0.03 | 0.03 | 0.03 | 0.03 |
| optical properties |  |  |  |  |  |
| thickness [mm] | 5 | 4 | 4 | 4 | 4 |
| YA [%] | 17.2 | 16.3 | 37.8 | 48.6 | 16.9 |
| TG [%] | 17.0 | 13.7 | 27.5 | 27.0 | 15.4 |
| Tuv [%] | 9.0 | 2.4 | 4.7 | 8.7 | 8.2 |
| DW [nm] | 556 | 522 | 494 | 502 | 521 |
| Pe [%] | 9.0 | 1.0 | 5.8 | 5.0 | 4.5 |
| physical properties |  |  |  |  |  |
| Tg [° C.] | 531.6 | 499.1 | 531.9 | 547.1 | 544.8 |
| Td [° C.] | 603.2 | 557.7 | 602.7 | 625.4 | 623.7 |
| $\alpha_{(50-350)} \times e^{-7}$ | 93.4 | 92.6 | 95.8 | 90.0 | 94.4 |
| E [GPa] | 76.2 | 77.3 | 74.3 | 74.0 | 75.0 |
| surface compressive stress [MPa] | 112.0 | 112.8 | 112.0 | 109.0 | 111.3 |
| temperature at which log η becomes 2 [° C.] | 1397 | 1387 | 1419 | 1430 | 1431 |

TABLE 3

|  | Example 6 | Example 7 | Example 8 | Example 9 | Example 10 |
|---|---|---|---|---|---|
| glass composition [wt. %] |  |  |  |  |  |
| $SiO_2$ | 71.4 | 71.2 | 71.6 | 72.0 | 71.6 |
| $Al_2O_3$ | 1.35 | 1.35 | 1.35 | 1.35 | 1.34 |
| MgO | 3.69 | 3.68 | 3.70 | 3.72 | 3.70 |
| CaO | 7.76 | 7.74 | 7.78 | 7.83 | 7.78 |
| $Na_2O$ | 13.3 | 13.3 | 12.4 | 11.4 | 11.3 |
| $K_2O$ | 0.77 | 0.76 | 0.77 | 0.77 | 0.77 |
| $Li_2O$ | 0.33 | 0.33 | 1.01 | 1.50 | 2.00 |
| $T\text{-}Fe_2O_3$ | 1.30 | 1.30 | 1.31 | 1.31 | 1.31 |
| $FeO/T\text{-}Fe_2O_3$ | 0.24 | 0.22 | 0.22 | 0.22 | 0.22 |
| NiO | 0.016 | 0.098 | 0.098 | 0.099 | 0.099 |
| CoO | 0.004 | 0.020 | 0.020 | 0.020 | 0.020 |
| Se | — | — | — | — | — |
| $Cr_2O_3$ | — | — | — | — | — |
| $TiO_2$ | 0.03 | 0.03 | 0.03 | 0.03 | 0.03 |
| optical properties |  |  |  |  |  |
| thickness [mm] | 4 | 3.5 | 3.5 | 3.5 | 3.5 |
| YA [%] | 49.8 | 20.8 | 20.7 | 20.6 | 20.6 |
| TG [%] | 27.9 | 19.3 | 19.1 | 19.1 | 19.0 |
| Tuv [%] | 9.8 | 10.3 | 10.1 | 9.8 | 9.8 |
| DW [nm] | 502 | 525 | 524 | 523 | 524 |
| Pe [%] | 5.0 | 4.3 | 4.3 | 4.4 | 4.2 |
| physical properties |  |  |  |  |  |
| Tg [° C.] | 535.5 | 539.2 | 518.6 | 510.2 | 504.7 |
| Td [° C.] | 612.2 | 615.4 | 596.8 | 598.1 | 586.2 |
| $\alpha_{(50-350)} \times e^{-7}$ | 95.1 | 96.5 | 91.2 | 90.2 | 93.8 |
| E [GPa] | 74.9 | 75.0 | 76.3 | 77.5 | 78.5 |
| surface compressive stress [MPa] | 112.1 | 114.3 | 109 | 110 | 117 |
| temperature at which log η becomes 2 [° C.] | 1417 | 1429 | 1429 | 1396 | 1390 |

It is apparent from Tables 2, 3 that each glass of the present invention has the temperature at which log η becomes 2, which is an index of high-temperature viscosity, so that the low transmittance glass of the present invention is excellent in meltability. Each low transmittance glass of the invention has also high surface compression, so that the low transmittance glass has large capacity for reinforcement.

Examples 1–10 have preferable optical properties, such as: visible light transmittance (YA) measured by using the CIE illuminant A of 5 to 65%, total solar radiation transmittance (TG) of not greater than 50% and ultraviolet transmittance (Tuv) defined by ISO 9050 of not greater than 20%. These examples also have dominant wavelength (DW) measured by using the CIE illuminant C of 490 to 560 nm and excitation purity (Pe) measured by using the CIE illuminant C of not greater than 9%.

COMPARATIVE EXAMPLES 1 AND 2

The glass composition, the optical properties and the physical properties of Comparative Examples 1 and 2 each of which was prepared in the same way as Examples 1–10 except for the glass composition are shown in Table 4.

TABLE 4

|  | Comparative Example 1 | Comparative Example 2 |
|---|---|---|
| glass composition [wt. %] | | |
| $SiO_2$ | 70.5 | 70.6 |
| $Al_2O_3$ | 1.66 | 1.66 |
| MgO | 3.72 | 3.70 |
| CaO | 7.96 | 7.86 |
| $Na_2O$ | 13.9 | 13.7 |
| $K_2O$ | 0.79 | 0.81 |
| $Li_2O$ | 0.00 | 0.00 |
| $T\text{-}Fe_2O_3$ | 1.26 | 1.29 |
| $FeO/T\text{-}Fe_2O_3$ | 0.27 | 0.23 |
| NiO | 0.016 | 0.064 |
| CoO | 0.005 | 0.018 |
| Se | — | — |
| $Cr_2O_3$ | — | — |
| $TiO_2$ | 0.03 | 0.03 |
| optical properties | | |
| thickness [mm] | 5.0 | 4.0 |
| YA [%] | 39.9 | 23.3 |
| TG [%] | 21.7 | 18.7 |
| Tuv [%] | 5.8 | 8.1 |
| DW [nm] | 502 | 496 |
| Pe [%] | 5.9 | 7.1 |
| physical properties | | |
| Tg [° C.] | 558.5 | 557.3 |
| Td [° C.] | 643.5 | 642.3 |
| $\alpha_{(50-350)} \times e^{-7}$ | 92.6 | 92.6 |
| E [GPa] | 74.2 | 74.2 |
| surface compressive stress [MPa] | 106.0 | 107.3 |
| temperature at which log η becomes 2 [° C.] | 1436 | 1434 |

Comparative Examples 1 and 2 are conventional low transmittance glasses which do not include $Li_2O$. These glasses have higher temperature at which log η becomes 2 and lower surface compression than those of the present invention, resulting in reduction of productivity and capacity for reinforcement.

As described above, the present invention provides a low transmittance glass composition having superior heat ray absorption characteristics and an advantage of high productivity. Particularly, the present invention provides a glass having low visible light transmittance which has smoky color, such as gray to green, and high heat ray absorption characteristics, more particularly, it provides a low transmittance glass which is suited for a window glass to be reinforced and installed in a vehicle.

[Ultraviolet/Infrared Absorbent Green Glass]

The ultraviolet/infrared absorbent green glass of the present invention preferably has the same base glass composition as the low transmittance glass mentioned above.

The ultraviolet/infrared absorbent green glass of the present invention preferably includes as colorant:

0.4 to 1 wt. % total iron oxide expressed as $Fe_2O_3$ ($T\text{-}Fe_2O_3$);

0 to 1 wt. % $TiO_2$; and 0 to 2 wt. % $CeO_2$.

The ultraviolet/infrared absorbent green glass preferably has ultraviolet transmittance (Tuv) defined by ISO 9050 of not greater than 35%, dominant wavelength (DW) measured by using the CIE illuminant C of 490 to 560 nm, and excitation purity (Pe) measured by using the CIE illuminant C of less than 6% when the glass has a thickness between 2.1 mm and 6 mm.

The ultraviolet/infrared absorbent green glass is preferable to include at least one selected from the group consisting of Se, CoO, $Cr_2O_3$, $Mn_2O_3$, CuO, $Nd_2O_3$, $Er_2O_3$, $MoO_3$, $V_2O_5$ and $La_2O_3$ in an amount of 0.0001 to 0.1 wt. %.

The description will be made as regard to the ultraviolet/infrared absorbent green glass composition of the present invention. It should be noted that content of each component will be represented with percentage by weight.

The description of the reason why the above base glass composition is desirable for the low transmittance glass applies equally to that for the ultraviolet/infrared absorbent green glass.

The description will be made as regard to the colorant of the ultraviolet/infrared absorbent green glass of the present invention.

Iron oxide is present in the form of $Fe_2O_3$ and the form of FeO in the glass. $Fe_2O_3$ is a component for improving the ultraviolet absorptivity and FeO is a component for improving the infrared absorptivity. When the total amount of iron oxide ($T\text{-}Fe_2O_3$) expressed as $Fe_2O_3$ is less than 0.4%, the efficiency of ultraviolet and infrared absorptivity becomes small so as not to provide desired optical properties. On the other hand, when $T\text{-}Fe_2O_3$ exceeds 2%, visible light transmittance becomes too low and the color of the glass unpreferably becomes too greenish. When $TiO_2$ and $CeO_2$ also are included in the glass, the content of $T\text{-}Fe_2O_3$ is preferable not to be greater than 1%.

When the $FeO/T\text{-}Fe_2O_3$ ratio (a weight of FeO expressed as $Fe_2O_3$ against $T\text{-}Fe_2O_3$) is less than 15%, sufficient heat ray absorptivity can not be obtained. If $FeO/T\text{-}Fe_2O_3$ ratio is more than 60%, silica-rich ream and silica scum are present, in a glass because the glass is highly reduced, unpreferably resulting in decrease of productivity and lapse of the effect of $Li_2O$. The $FeO/T\text{-}Fe2O_3$ ratio is preferable not to be greater than 50%, more preferable not to be greater than 35%.

$TiO_2$ is a component for improving the ultraviolet absorptivity particularly by interaction with FeO. The content of $TiO_2$ is preferable not to be greater than 1%. More than 1% $TiO_2$ unpreferably raises cost and makes the shade of the glass yellowish. When the effect of absorbing ultraviolet of $TiO_2$ is expected, $TiO_2$ is preferably added in an amount of 0.01% or more.

$CeO_2$ is a component for improving the ultraviolet absorptivity and is present in the form of $Ce^{3+}$ or in the form of $Ce^{4+}$ in the glass. Particularly, $Ce^{3+}$ is effective in absorbing ultraviolet with less absorptivity in the visible range. The content of $CeO_2$ is preferable not to be greater than 2%. More than 2% $CeO_2$ unpreferably raises cost and reduces visible light transmittance. When the effect of absorbing ultraviolet of $CeO_2$ is expected, $CeO_2$ is preferably added in an amount of 0.01% or more.

In order to obtain more desirable shade and optical properties, at least one selected from the group consisting of Se, CoO, $Cr_2O_3$, $Mn_2O_3$, CuO, $Nd_2O_3$ and $Er_2O_3$ as colorant and the group consisting of $MoO_3$, $V_2O_5$ and $La_2O_3$ as auxiliary ultraviolet absorbing agent may be added in an amount of 0.0001 to 1%.

Sulfate of alkaline or alkaline earth metal has been added as a refining agent for the glass, and the glass usually includes $SO_3$ in an amount of about 0.1 to 0.5%. One or more than two among $Sb_2O_3$, $SnO_2$, and the like may be added as a reducing agent or a refining agent for the glass in an amount not greater than 1%. In order further securely to prevent the formation of nickel sulfide stones, ZnO may be added in an amount not greater than 1%.

The ultraviolet/infrared absorbent green glass of the present invention is preferable to have visible light transmittance (YA) of not less than 70%, measured by using the CIE illuminant A, and total solar radiation transmittance (TG) of not greater than 60% when the glass has a thickness between 2.1 mm and 6 mm.

The ultraviolet/infrared absorbent green glass of the present invention has ultraviolet transmittance (Tuv) defined by ISO 9050 of not greater than 35%, dominant wavelength (DW) measured by using the CIE illuminant C of 490 to 560 nm, and excitation purity (Pe) measured by using the CIE illuminant C of less than 6%.

Hereinafter, examples and comparative examples of the ultraviolet/infrared absorbent green glass of the present invention will be described.

EXAMPLES 11–22

Lithium oxide, ferric oxide, titanium oxide, cerium oxide, metallic selenium, cobalt oxide, nickel oxide, chromium oxide, manganese oxide, copper oxide, neodymium oxide, erbium oxide, molybdenum oxide, vanadium pentoxide, lanthanum oxide and carbon based reducing agent, including carbon powder, etc., were added to the typical soda lime silica glass batch material as desired. The glass material thus prepared was held in an electric furnace at 1500° C., for 4 hours. The molten glass was cast on a stainless plate, and then annealed to the room temperature so as to obtain 6 mm thick glass plates.

The obtained glass plates were polished, so that each glass plate has a thickness between 2.6 mm and 5 mm, so as to obtain the samples. Each sample was determined in optical properties including visible light transmittance (YA) measured by using the CIE illuminant A, total solar radiation transmittance (TG), ultraviolet transmittance (Tuv) defined by ISO 9050, dominant wavelength (DW) and excitation purity (Pe) measured by using the CIE illuminant C.

The samples were also determined in physical properties including glass transition temperature (Tg), deformation temperature (Td), mean thermal expansion coefficient of the 50 to 350° C. range ($\alpha_{(50-350)}$), Young's modulus (E), surface compression and the temperature at which log $\eta$ becomes 2. Each sample was formed into a rod-like shape having a length of 15 mm and a diameter of 5 mm, and then it was loaded with a load of 5 g and heated from the room temperature to 700° C. at a rate of 10° C. per minutes with silica glass rod prepared as a standard sample by the use of EXSTAR 6000 (SEIKO Electronics Inc.), so as to measure glass transition temperature (Tg), deformation temperature (Td) and mean thermal expansion coefficient of the 50 to 350° C. range ($\alpha_{(50-350)}$). Young's modulus (E) was measured with ultrasonic wave according to sing-around method, surface compression was measured with a Babinet-Style surface stress meter according to via-scope method, and the temperature at which log $\eta$ becomes 2 was measured according to platinum ball drawing method.

The glass composition and FeO/T-$Fe_2O_3$ ratio of each sample were shown in Tables 5 and 6. The contents of the components in these tables are indicated as percentage by weight. Tables 5 and 6 also show the optical properties and the physical properties of each sample.

TABLE 5

| | Example 11 | Example 12 | Example 13 | Example 14 | Example 15 | Example 16 |
|---|---|---|---|---|---|---|
| glass composition [wt. %] | | | | | | |
| $SiO_2$ | 70.8 | 70.9 | 69.5 | 69.5 | 68.2 | 68.3 |
| $Al_2O_3$ | 1.74 | 1.88 | 1.71 | 1.91 | 2.87 | 2.87 |
| MgO | 4.09 | 4.02 | 3.19 | 3.11 | 1.64 | 1.65 |
| CaO | 7.94 | 7.96 | 8.26 | 8.44 | 9.21 | 9.22 |
| $Na_2O$ | 13.8 | 13.6 | 14.5 | 14.4 | 15.0 | 14.8 |
| $K_2O$ | 0.80 | 0.96 | 0.23 | 0.07 | 0.92 | 0.92 |
| $Li_2O$ | 0.05 | 0.09 | 0.06 | 0.12 | 0.16 | 0.33 |
| T-$Fe_2O_3$ | 0.51 | 0.55 | 0.63 | 0.65 | 0.64 | 0.64 |
| FeO/T-$Fe_2O_3$ | 0.23 | 0.24 | 0.32 | 0.31 | 0.22 | 0.18 |
| $TiO_2$ | — | — | 0.09 | 0.14 | 0.16 | 0.16 |
| $CeO_2$ | — | — | 1.65 | 1.65 | 1.17 | 1.17 |
| optical properties | | | | | | |
| thickness [mm] | 5.0 | 3.5 | 4.0 | 3.4 | 3.1 | 3.1 |
| YA [%] | 78.5 | 80.3 | 72.9 | 75.3 | 77.0 | 77.5 |
| TG [%] | 54.9 | 59.7 | 45.5 | 49.5 | 49.6 | 50.7 |
| Tuv [%] | 24.5 | 32.4 | 8.6 | 10.1 | 15.0 | 15.3 |
| DW [nm] | 500 | 500 | 508 | 510 | 497 | 498 |
| Pe [%] | 2.4 | 1.9 | 2.6 | 2.2 | 3.1 | 2.9 |
| physical properties | | | | | | |
| Tg [° C.] | 557.3 | 555.3 | 556.2 | 552.3 | 544.0 | 537.6 |
| Td [° C.] | 626.8 | 623.0 | 629.9 | 627.9 | 624.3 | 618.1 |
| $\alpha_{(50-350)} \times e^{-7}$ | 92.9 | 93.1 | 94.3 | 93.9 | 100.8 | 101.8 |
| E [GPa] | 75.40 | 75.60 | 75.14 | 75.47 | 75.10 | 75.37 |
| surface compressive stress [MPa] | 109.9 | 110.5 | 111.4 | 111.4 | 120.8 | 122.7 |
| temperature at which log $\eta$ becomes 2 [° C.] | 1384 | 1381 | 1384 | 1383 | 1383 | 1380 |

TABLE 6

| | Example 17 | Example 18 | Example 19 | Example 20 | Example 21 |
|---|---|---|---|---|---|
| glass composition [wt. %] | | | | | |
| $SiO_2$ | 68.3 | 67.9 | 70.0 | 69.0 | 69.5 |
| $Al_2O_3$ | 2.87 | 2.85 | 1.70 | 2.40 | 1.90 |
| MgO | 1.65 | 1.64 | 2.70 | 1.70 | 1.70 |
| CaO | 9.23 | 9.16 | 8.04 | 9.11 | 9.00 |
| $Na_2O$ | 14.5 | 14.7 | 13.5 | 13.4 | 14.1 |
| $K_2O$ | 0.92 | 0.92 | 0.75 | 0.75 | 0.80 |
| $Li_2O$ | 0.50 | 0.33 | 1.50 | 2.00 | 1.00 |
| $T\text{-}Fe_2O_3$ | 0.64 | 0.78 | 0.80 | 0.88 | 0.80 |
| $FeO/T\text{-}Fe_2O_3$ | 0.18 | 0.27 | 0.26 | 0.24 | 0.24 |
| $TiO_2$ | 0.16 | 0.29 | 0.06 | 0.10 | 0.06 |
| $CeO_2$ | 1.17 | 1.44 | 0.65 | 0.60 | 0.87 |
| optical properties | | | | | |
| thickness [mm] | 3.1 | 2.6 | 2.6 | 2.6 | 2.6 |
| YA [%] | 77.2 | 75.0 | 75.7 | 74.9 | 76.5 |
| TG [%] | 50.1 | 47.0 | 47.6 | 43.9 | 49.6 |
| Tuv [%] | 15.3 | 12.7 | 15.6 | 11.8 | 15.0 |
| DW [nm] | 498 | 503 | 499 | 515 | 508 |
| Pe [%] | 3.0 | 2.6 | 2.6 | 2.7 | 2.4 |
| physical properties | | | | | |
| Tg [° C.] | 530.2 | 535.4 | 517.4 | 501.0 | 511.7 |
| Td [° C.] | 605.1 | 611.6 | 585.2 | 562.8 | 575.9 |
| $\alpha_{(50-350)} \times e^{-7}$ | 101.6 | 100.6 | 101.6 | 101.7 | 101.7 |
| E [GPa] | 75.86 | 75.30 | 78.50 | 78.20 | 76.00 |
| surface compressive stress [MPa] | 123.4 | 120.8 | 123.6 | 123.1 | 123.8 |
| temperature at which log η becomes 2 [° C.] | 1380 | 1381 | 1378 | 1377 | 1378 |

It is apparent from Tables 5, 6 that each glass of the present invention has the temperature at which log η becomes 2, which is an index of high-temperature viscosity, so that the ultraviolet/infrared absorbent green glass of the present invention is excellent in meltability. Each ultraviolet/infrared absorbent green glass of the invention has also high surface compression, so that the ultraviolet/infrared absorbent green glass has large capacity for reinforcement.

Examples 11–21 have preferable optical properties, such as: ultraviolet transmittance (Tuv) defined by ISO 9050 of not greater than 35%, dominant wavelength (DW) measured by using the CIE illuminant C of 490 to 560 nm and excitation purity (Pe) measured by using the CIE illuminant C of smaller than 6% when each glass has a thickness between 2.1 mm to 6 mm.

Examples 13–22 have more preferable optical properties to Examples 11 and 12 because ultraviolet transmittance (Tuv) of Examples 13–22 is lower than that of Examples 11 and 12.

COMPARATIVE EXAMPLES 3 AND 4

The glass composition, the optical properties and the physical properties of Comparative Examples 3 and 4 each of which was prepared in the same way as Examples 11–21 except for the glass composition are shown in Table 7.

TABLE 7

| | Comparative Example 3 | Comparative Example 4 |
|---|---|---|
| glass composition [wt. %] | | |
| $SiO_2$ | 71.3 | 69.9 |
| $Al_2O_3$ | 1.55 | 1.48 |
| MgO | 4.02 | 3.13 |
| CaO | 7.99 | 8.49 |
| $Na_2O$ | 13.7 | 14.5 |
| $K_2O$ | 0.97 | 0.07 |
| $Li_2O$ | 0.00 | 0.00 |
| $T\text{-}Fe_2O_3$ | 0.52 | 0.65 |
| $FeO/T\text{-}Fe_2O_3$ | 0.22 | 0.31 |
| $TiO_2$ | — | 0.14 |
| $CeO_2$ | — | 1.65 |
| optical properties | | |
| thickness [mm] | 3.4 | 3.4 |
| YA [%] | 82.9 | 75.4 |
| TG [%] | 63.9 | 49.7 |
| Tuv [%] | 32.2 | 10.0 |
| DW [nm] | 500 | 510 |
| Pe [%] | 1.7 | 2.2 |
| physical properties | | |
| Tg [° C.] | 555.5 | 552.7 |
| Td [° C.] | 624.5 | 628.1 |
| $\alpha_{(50-350)} \times e^{-7}$ | 92.7 | 93.6 |
| E [GPa] | 74.59 | 74.40 |
| surface compressive stress [MPa] | 108.1 | 109.1 |
| temperature at which log η becomes 2 [° C.] | 1410 | 1387 |

Comparative Examples 3 and 4 are conventional ultraviolet/infrared absorbent glasses which do not include $Li_2O$. These glasses have higher temperature at which log η becomes 2 and lower surface compression than those of the present invention, resulting in reduction of productivity and capacity for reinforcement.

As described above, the present invention makes it possible to produce an ultraviolet/infrared absorbent glass having high visible light transmittance and greenish shade at lower cost than that of conventional ones, because the present invention reduces viscosity of the glass at high temperature. Particularly, the ultraviolet/infrared absorbent green glass of the present invention exhibits superior capacity for reinforcement, so that it is especially fitted for a window glass of a vehicle.

What is claimed is:

1. Ultraviolet/infrared absorbent green glass consisting essentially of base glass composition and colorant, said base glass composition consisting essentially of:

65 to 80 wt. % $SiO_2$;

0.001 to 2 wt. % of $Li_2O$;

0 to 5 wt. % $Al_2O_3$;

0 to 10 wt. % MgO;

5 to 15 wt. % CaO wherein a total amount of MgO and CaO is 5 to 15 wt. %;

10 to 20 wt. % $Na_2O$;

0 to 5 wt. % $K_2O$ wherein a total amount of $Na_2O$ and $K_2O$ is 10 to 20 wt. %; and 0 to 5 wt. % $B_2O_3$, and said colorant including:

0.4 to 1 wt. % total iron oxide expressed as $Fe_2O_3$ (T-$Fe_2O_3$), wherein FeO expressed as $Fe_2O_3$ is 15 to 60% of T-$Fe_2O_3$;

0 to 1 wt. % $Ti_2O$; and 0 to 2 wt. % $CeO_2$, wherein said glass has visible light transmittance (YA) of not less than 70%, measured by using CIE illuminant A, and total solar radiation transmittance (TG) of not greater than 60%, when said glass has a thickness between 2.1 mm and 6 mm.

2. Ultraviolet/infrared absorbent green glass as claimed in claim 1, wherein $Li_2O$ is contained in an amount of less than 2 wt. %.

3. Ultraviolet/infrared absorbent green glass as claimed in claim 1, wherein $Li_2O$ is contained in an amount of 0.05 to 0.5 wt. %.

4. Ultraviolet/infrared absorbent green glass as claimed in claim 1, wherein said ultraviolet/infrared absorbent green glass includes:

0.01 to 1 wt. % $Ti_2O$; and 0.01 to 2 wt. % $CeO_2$.

5. Ultraviolet/infrared absorbent green glass as claimed in claim 1, wherein said ultraviolet/infrared absorbent green glass has ultraviolet transmittance (Tuv) defined by ISO 9050 of not greater than 35%, dominant wavelength (DW) measured by using CIE illuminant C of 490 to 560 nm, and excitation purity (Pe) measured by using the CIE illuminant C of less than 6%, when said glass has a thickness between 2.1 mm and 6 mm.

6. Ultraviolet/infrared absorbent green glass as claimed in claim 1, wherein said colorant further includes at least one material selected from the group consisting of Se, CoO, $Cr_2O_3$, $Mn_2O_3$, CuO, $Nd_2O_3$, $Er_2O_3$, $MoO_3$, $V_2O_5$ and $La_2O_3$ in an amount of 0.0001 to 0.1 wt %.

7. Ultraviolet/infrared absorbent green glass as claimed in claim 1, wherein said glass has surface compression of more than 109.9 MPa after tempering.

8. Ultraviolet/infrared absorbent green glass as claimed in claim 1, wherein said glass has surface compression of between 109.9 MPa and 123.8 MPa after tempering.

9. Ultraviolet/infrared absorbent green glass as claimed in claim 4, wherein said colorant of the glass consists essentially of 0.4 to 1 wt. % total iron oxide, 0.01 to 1 wt. % $Ti_2O$, and 0.01 to 2 wt. % $CeO_2$.

* * * * *